E. J. SMITH.
BALL BEARING CASTER.
APPLICATION FILED APR. 13, 1918.
1,356,566. Patented Oct. 26, 1920.
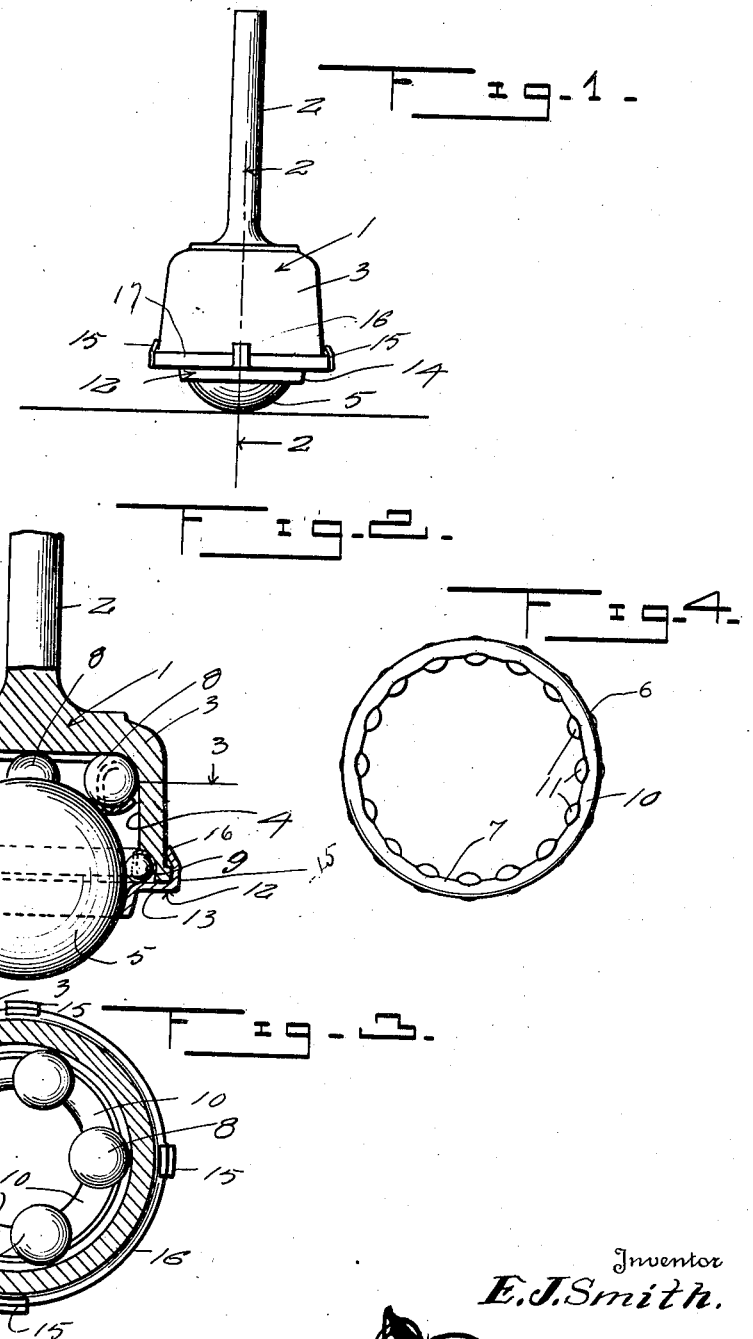

UNITED STATES PATENT OFFICE.

ELWIN J. SMITH, OF ROME, NEW YORK.

BALL-BEARING CASTER.

1,356,566.  Specification of Letters Patent.  Patented Oct. 26, 1920.

Application filed April 13, 1918. Serial No. 228,440.

*To all whom it may concern:*

Be it known that I, ELWIN J. SMITH, a citizen of the United States, residing at Rome, in the county of Oneida and State of New York, have invented certain new and useful Improvements in Ball-Bearing Casters; and I do hereby declare the following to be a full, clear, and exact description of the invention, such as will enable others skilled in the art to which it appertains to make and use the same.

This invention relates to casters and the primary object of the invention is to provide an improved caster having a socket formed in the lower portion thereof, which receives an enlarged ball-bearing ball, so that the same can roll in all directions, thus eliminating the usual inconveniences associated with the ordinary casters.

Another object of the invention is to provide an improved caster having a socket which is adapted to rotatably receive an enlarged supporting ball, said socket being provided with a plurality of ball-bearings which receive the supporting ball, so as to facilitate the movement of the same.

A further object of this invention is to provide an improved caster having a socket therein arranged to receive a supporting ball, the socket having enlarged bearing balls in the upper portion thereof for supporting the upper portion of the ball, and having relatively small bearings positioned around the outer edge of the socket for receiving the side thrusts of the ball, and retaining means carried by the socket for securing the ball and bearings in place.

A still further object of the invention is to provide an improved ball-bearing caster, of the above character, which is durable and efficient in use, one that is simple and easy to manufacture, and one that can be placed upon the market at a reasonable cost.

With these and other objects in view the invention consists in the novel construction, arrangement and formation of parts, as will be hereinafter more specifically described, claimed and illustrated in the accompanying drawings forming a part thereof in which:

Figure 1 is a side elevation of the improved caster,

Fig. 2 is a vertical section taken on the line 2—2 of Fig. 1,

Fig. 3 is a transverse section taken on the line 3—3 of Fig. 2, and

Fig. 4 is a plan view of the ball-bearing retainers.

Referring to the drawings in detail, wherein similar reference numerals designate corresponding parts throughout the several views, the numeral 1 generally indicates the improved ball-bearing caster having a shank 2 which is adapted to be secured by any suitable means to the furniture leg (not shown). The lower end of the shank is provided with an enlarged head 3 in which is formed a socket 4 for receiving the supporting ball 5, which is formed of any suitable material, such as steel, glass and the like.

The upper side walls of the socket 4 are provided with a curved face 6 and a ball-bearing retainer 7 carrying relatively large ball-bearings 8 is positioned in the socket, so that the balls engage the curved wall 6. These balls receive the upward thrusts of the supporting ball 5 and facilitate rolling thereof.

The lower inner edge of the socket 4 is provided with an annular groove 9, forming a ball-bearing race in which is fitted the annular ball-bearing retaining ring 10, carrying the relatively small ball-bearings 11, which engage the sides of the ball 5 and form bearings for the sides thereof and these balls facilitate the rolling movement thereof.

A suitable annular retaining cap 12 is provided and consists of an annular flat plate 13 having a downwardly extending inner flange 14, which is curved inwardly or transversely to conform the curvature of the supporting ball 5 and the flange forms means for preventing displacement of the same. The annular plate 15 also forms means for engaging the ball-bearings 11 and for holding the same in position. The retaining cup has a plurality of upwardly extending inwardly bent spring tongues 16 which are adapted to engage an annular rib 17 formed on the outer edge of the socket, and forms means for holding the ball in place. However any other suitable means for retaining the ball in place can be provided and if so desired the cap can be formed with an upwardly extending flange, having internal threads which can be turned on the outer surface of the socket.

The ball-bearing retainers are of the conventional type and include the annular member U-shaped in cross section having a plurality of ball receiving slots 18 formed therein.

The ball retainers may be entirely dispensed with and the large ball-bearings may be inserted so as to run free between the curved wall 3 and the ball 5 and the ball-bearings 11 allowed to run free in the race 9.

From the foregoing description it can be seen that an improved ball-bearing caster is provided in which the weight of the object being supported is positioned at the central portion of the socket which prevents breaking of the same and in which the supporting ball, is supported by suitable ball-bearings which effectively hold the same for rotation.

In practice, I have found that the form of my invention, illustrated in the accompanying drawings and referred to in the above description, as the preferred embodiments, is the most efficient and practical; yet realizing the conditions concurrent with the adoption of my device will necessarily vary, I desire to emphasize the fact that various minor changes in details of construction, proportion and arrangement of parts may be resorted to, when required, without sacrificing any of the advantages of my invention as set forth.

What I claim as new is:

A caster comprising a shank, a socket formed on one end of the shank, the upper and side walls of the socket being connected by a curved wall, a relatively large supporting ball positioned in the socket, relatively large ball-bearings arranged between the curved walls of the socket and the supporting ball, the inner edge of the socket being provided with an annular groove forming a ball race, a plurality of relatively small ball-bearings fitted in the annular groove, an outstanding rib formed on the outer edge of the socket, an annular retaining plate arranged to engage the lower edge of the socket, and spring tongues formed on the plate and arranged to engage said rib for holding the plate in position, the inner portion of the plate engaging the caster ball and the small balls and serving to hold the small balls in the race.

In testimony whereof I affix my signature in presence of two witnesses.

ELWIN J. SMITH.

Witnesses:
FLORENCE WHITE,
MERRITT N. WILLSON.